United States Patent [19]

Koval et al.

[11] Patent Number: 4,908,132
[45] Date of Patent: Mar. 13, 1990

[54] SHOCK RESISTANT RECEIVER DEHYDRATOR

[75] Inventors: Richard Koval, North Rose, N.Y.; Robert C. Aman, Jr., Prior Lake, Minn.; Walter O. Krause, Newark, N.Y.

[73] Assignee: Parker Hannifin Corporation, Cleveland, Ohio

[21] Appl. No.: 385,768

[22] Filed: Jul. 26, 1989

[51] Int. Cl.$^4$ .............................................. B01D 29/00
[52] U.S. Cl. ...................... 210/446; 55/316; 55/387; 62/474; 210/282; 210/DIG. 7
[58] Field of Search ................ 55/316, 387, 485, 507, 55/509, 528; 62/474; 210/282, 445, 446, 456, DIG. 6, DIG. 7

[56] References Cited

U.S. PATENT DOCUMENTS 4,474,661 10/1984 Neorpass et al. ............... 210/446 X
4,811,571 3/1989 Mayer ..................... 62/474

OTHER PUBLICATIONS

Catch—All Form No. 40-119 Sporran Valve Company Date—Unknown.
Drawings of Parker Hannifin—Receiver Dehydrator Date—Prior to 1981.

Primary Examiner—Charles Hart
Attorney, Agent, or Firm—Ralph E. Jocke

[57] ABSTRACT

An impact and vibration resistent receiver dehydrator for use in a refrigeration or air conditioning system includes a body (10) enclosing a desiccant core (24). The core includes a projection (32) at a first end and a flat face (38) at a second end. The projection is nested in a resilient core support (50) which in turn is supported by a spring loaded baffle plate (56). The resilient core support is positioned in a recess (58) in the baffle plate. The baffle plate includes a radially extending flange (60) which serves to hold the baffle plate and first end of the core in fixed position relative to the interior of said receiver dehydrator body. The face of the second end of the core is supported by a perforated disc (42). A compressible filter pad (46) is positioned between the disc and the core. The filter pad wraps around the edge (40) of the core and serves to space and cushion the core from the interior of the body. The resilient core support and baffle plate serve to distribute the force of impacts to the body and cushion the core at the first end. The filter pad also serves to catch any fragments of the core and prevent them from escaping from the receiver dehydrator in the event the core is fractured.

12 Claims, 4 Drawing Sheets

SHOCK RESISTANT RECEIVER DEHYDRATOR

TECHNICAL FIELD

This invention relates to receiver dehydrators used in air conditioning and refrigeration systems. Particularly, this invention relates to a receiver dehydrator which is resistant to damage due to impact and vibration.

BACKGROUND ART

Receiver dehydrators are used in air conditioning and refrigeration systems to remove water and other impurities from oil and refrigerant commonly used in such systems. Receiver dehydrators which are also referred to as refrigerant filter dryers, conventionally include a desiccant core which serves as a filter element. The desiccant core is enclosed within a thin walled can or body. Cores are generally made of molded desiccant materials such as activated alumina. Molded cores are relatively brittle and may be subject to breakage if the receiver dehydrator is dropped during handing prior to installation. The core itself may also be subject to breakage due to vibration from nearby equipment. Damage may also result if the body of the receiver dehydrator is inadvertently struck by a wrench or other tool during servicing of the refrigeration or air conditioning system.

If the core of a receiver dehydrator is broken, its filtering and water removal efficiencies will be adversely impacted or eliminated. Small pieces of the core may also escape and travel into other areas of the system. These core fragments may result in damage to other components of the system.

Others have previously developed receiver dehydrators with enhanced impact and vibration resistance. Once such unit is the Catch All ® receiver dehydrator produced by Sporlan Valve Company. This receiver dehydrator uses a cylindrical core housed within a cylindrical thin walled body. The core is positioned inside the body and has a metal plate affixed to a first end of the core. A metal leaf spring applies force to the plate. An opposed second end of the core is positioned on a relatively rigid, ring-shaped seal. A rigid centering strip is positioned between the outside surface of the cylindrical core and an inner wall of the body. The centering strip prevents movement of the core at the second end. The force applied by the spring holds the core in compression. This helps to hold the core intact in the event of shock or vibration. Applicants have found, however, that impacts, particularly those transverse to a longitudinal axis of the core, will result in damage. This prior design also employs a fine mesh screen adjacent an outlet end of the receiver dehydrator to minimize the possibility that fragments of a damaged core will pass out of the unit and into the remainder of the system.

Parker Hannifin Corporation, the assignee of the present invention, has also previously developed receiver dehydrators that have enhanced resistance to damage due to impact and vibration. These designs include a core block which has a projection at a first end. The projection of the core block is nested in a recess in a spring loaded plate. The plate has three equally spaced radially extending fingers which extend to adjacent an inner wall of the cylindrical body of the receiver dehydrator. The opposed second end of the core block is also spring loaded and is positioned on a perforated disc. An outer perimeter of the core block at the second end includes flutes or projections, which contact the interior surface of the cylindrical body. While this construction is also resistant to shock and vibration damage, the core block is nonetheless subject to breakage in many circumstances.

Thus, there exists a need for a receiver dehydrator which has enhanced resistance to damage due to impact and vibration.

SUMMARY OF INVENTION

It is an object of the present invention to provide a receiver dehydrator that resists damage due to impact.

It is a further object of the present invention to provide a receiver dehydrator that resists damage due to vibration.

It is a further object of the present invention to provide a receiver dehydrator that minimizes the possibility that fragments from a broken core can escape from the receiver dehydrator into the remainder of a system.

Further objects of the present invention will be made apparent in the following Best Mode for Carrying Out the Invention and the Appended Claims.

The foregoing objects are accomplished by a receiver dehydrator having a generally cylindrical body. The body is comprised of a first end cap and a second end cap which include refrigerant inlets and outlets respectively. The body also includes a cylindrical portion disposed between the end caps. A molded cylindrical desiccant core having a central bore is positioned inside the body coaxially with the cylindrical body portion. The core is smaller in diameter than the internal circumference of the cylindrical portion along its entire length so that the outer surface of the core is disposed from an inner wall of the body. At a first end, the core includes a cylindrical projection. A second opposed end of the core terminates in a blunt flat face.

A disc shaped baffle plate is positioned inside the body adjacent the first end of the core. The baffle plate includes a circular flange which extends radially outward to adjacent the inner surface of the cylindrical portion of the body. The flange includes a plurality of spaced holes which enable refrigerant and oil to pass therethrough. The baffle plate also includes a centrally located cylindrical recess. The baffle plate is biased toward the core by a coil spring. A cup shaped resilient core support is positioned in the recess of the baffle plate between the plate and the core. The core support includes a projecting ring which overlaps the projection of the core about its circumference to hold it in position. The flange of the baffle plate which is in close proximity of the wall, prevents movement of the core and distributes the force of any impact on the body. The resilient core support minimizes the force transmitted from the baffle plate to the first end of the core.

A perforated disc is positioned adjacent the flat second end of the core. A compressible filter pad is positioned between the face of the second end and the perforated disc. The filter pad extends under the core and outward to the inner surface of the cylindrical portion of the body. An outer portion of the pad wraps around an edge of the blunt end of the core as the pad is compressed. An outer portion of the pad serves as a spacer which both cushions the second end of the core and minimizes the transmission of impact and vibration forces from the body to the core. The filter pad also serves as a fine particle trap which catches fragments of the core in the event it should be fractured or broken.

BEST MODE FOR CARRYING OUT INVENTION

Figure 1:
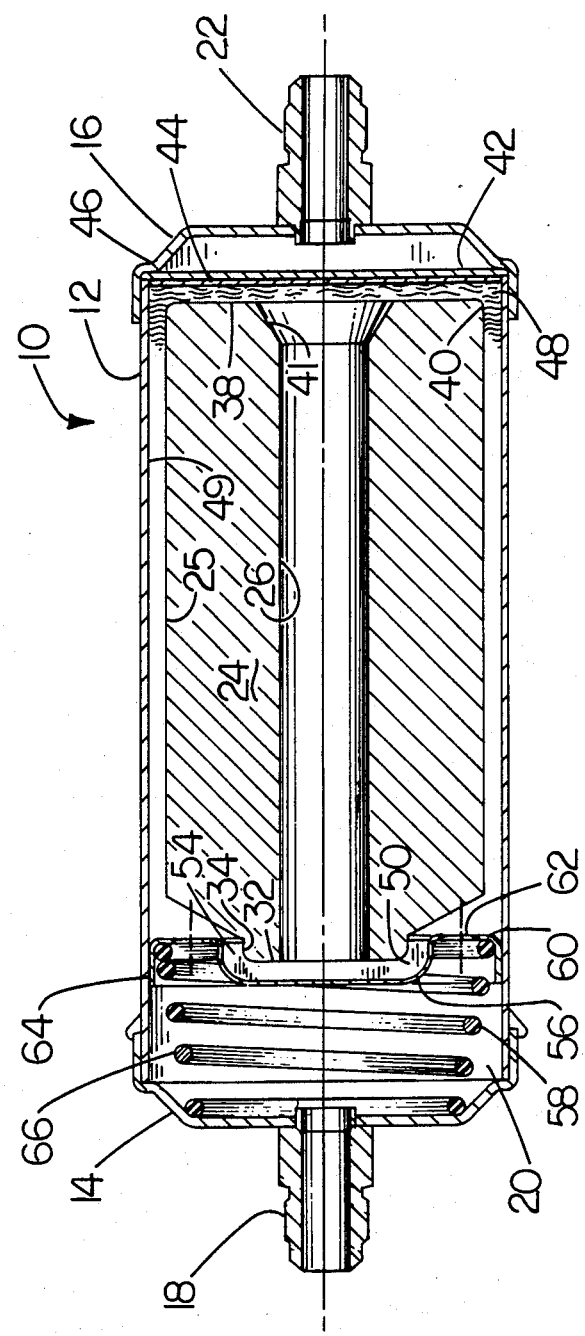
FIG. 1 is a cross sectional view of a preferred embodiment of a receiver dehydrator of the present invention.

Referring now to the drawings and particularly to FIG. 1 there is shown therein a receiver dehydrator of the present invention. The receiver dehydrator has a body generally indicated 10. Body 10 includes a thin walled cylindrical portion 12, a first end cap 14 and a second end cap 16. The cylindrical portion and the end caps are welded together in a fluid tight relation to form the body assembly.

First end cap 14 includes an inlet fitting 18 which serves as refrigerant inlet means for enabling refrigerant and oil to enter an interior area of the body generally indicated 20. Second end cap 16 includes an outlet fitting 22 which serves as refrigerant outlet mean for enabling refrigerant and oil to flow out of interior area 20. Fittings 18 and 22 may be of the conventional threaded variety to facilitate the attachment of the receiver dehydrator to conduit lines.

Figure 3:
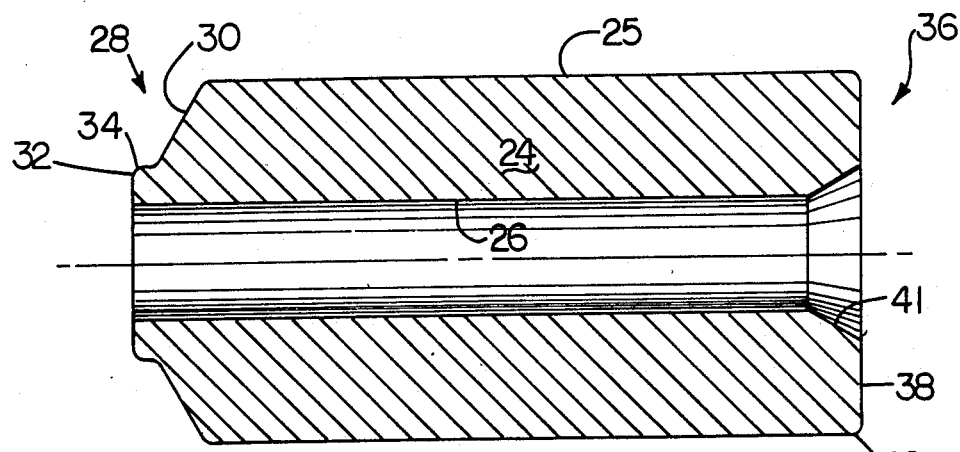
FIG. 3 is a cross sectional view of the core of the receiver dehydrator.
Figure 2:
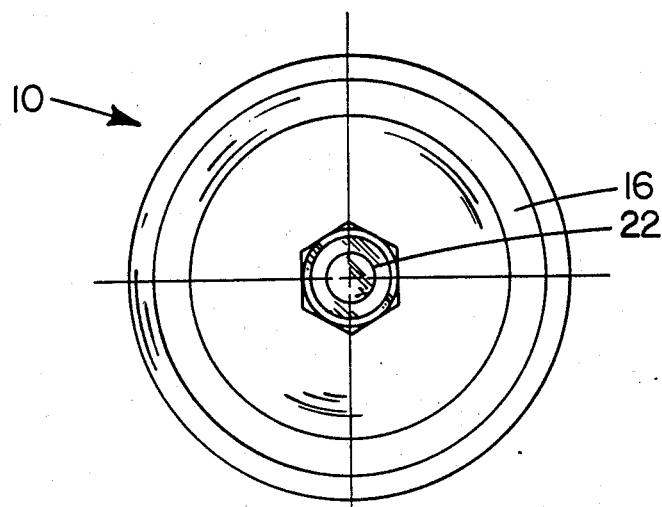
FIG. 2 is an end view of the receiver dehydrator shown in FIG. 1.

Housed within the body of the receiver dehydrator is a molded desiccant core generally indicated 24. As shown in FIG. 3, core 24 is generally cylindrical in shape and has an outer circumferential surface 25. Core 24 incorporates a central bore 26 which extends axially therethrough. A first end 28 of the core includes a frustoconical ledge 30 which terminates at a centered cylindrical projection 32. Projection 32 includes a lateral perimeter surface 34 the purpose of which is later explained. The central bore 26 extends through the center of cylindrical projection 32.

Core 24 also includes a flat blunt second end generally indicated 36, opposite first end 28. Second end 36 has a flat face 38. Central bore 26 terminates in a tapered opening 41 in face 38. Cylindrical outer surface 25 of the core meets face 38 at a perimeter edge 40. In other embodiments of the invention the bore need not extend all the way through the core, but instead may be a blind bore open only at the second end.

As shown in FIG. 1, a perforated disc 42 is positioned inside body 10 adjacent the second end of core 24. A screen 44 is positioned on disc 42 adjacent the core. The perforated disc and screen serve as supporting means for supporting the second end of the core. A compressible filter pad 46 is positioned between screen 44 and face 38 of the core. In the preferred form of the invention the pad is made of polyester material and is circular in shape. An outer portion of pad 48 extends into contact with an inner surface 49 of cylindrical portion 12. Filter pad 46 is generally pervious to refrigerant and oil which may pass freely therethrough. As shown in FIG. 1 when filter pad 46 is compressed, outer portion 48 wraps around perimeter edge 40 and serves as a spacer which prevents the core from being dislodged and contacting inner surface 49.

Figures 6, 7:
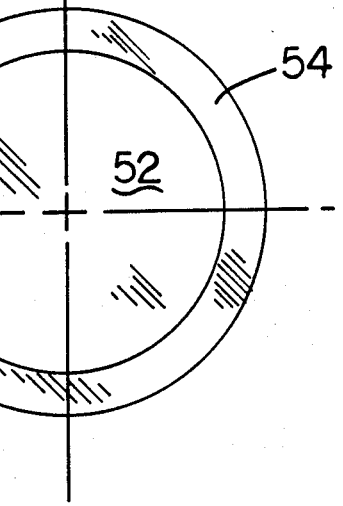
FIG. 6 is a cross sectional view of a core support of the receiver dehydrator.
FIG. 7 is a plan view of the core support shown in FIG. 6.

Projection 32 at the first end of core 24 is nested in a resilient core support 50. As shown in FIGS. 6 and 7, core support 50 includes a flat portion 52 and a projecting ring portion 54. Flat portion 52 blocks central bore 26 at the first end of the core. The projecting ring portion 54 wraps around the lateral perimeter surface 34 of the central projection of the core.

Figure 5:
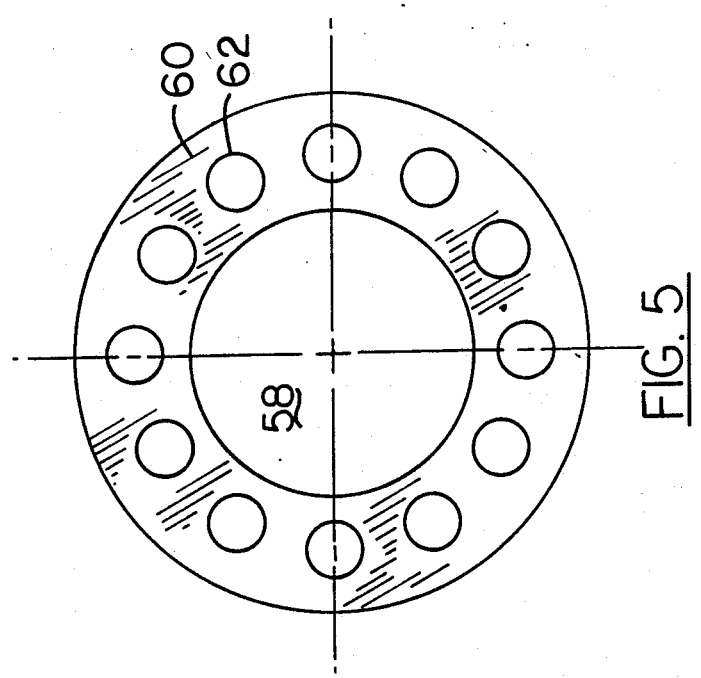
FIG. 5 is a plan view of the baffle plate shown in FIG. 4.
Figure 4:
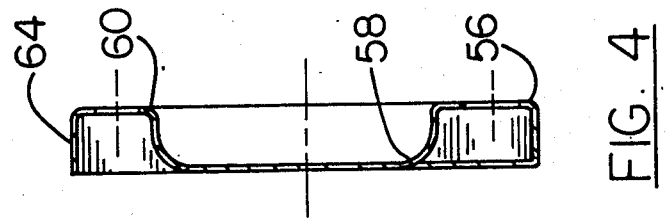
FIG. 4 is a cross sectional view of a baffle plate used in the receiver dehydrator.

Resilient core support 50 is positioned n a baffle plate 56. As shown in FIGS. 4 and 5, baffle plate 56 includes a cup shaped recess 58 in which core support is nested. Baffle place 56 also includes an outwardly extending flange portion 60. Flange portion 60 includes a plurality of holes 62 which serve as passage means for the refrigerant and oil. Flange portion 60 terminates in a circular lip 64. As shown in FIG. 1, circular lip 64 extends adjacent inner surface 49 which prevents movement of the baffle plate inside the body in other than the longitudinal direction.

A coil spring 66 serves as biasing means for biasing the baffle plate 56 toward the core. At a first end coil spring 66 abuts an inner surface of first end cap 14. At a second end, spring 66 nests in the baffle plate 56 between recess 58 and lip 64. Spring 66 serves to hold core 24 in compression which helps to prevent damage to the core. The compression force also causes filter pad 46 to deform and wrap around the edge of the core at the second end which serves to cushion the core and keep it spaced from the metal body. The force of spring 66 also maintains the resilient core support in firm contact with cylindrical projection 32 of the core.

In operation of the receiver dehydrator, refrigerant and oil enter the interior 20 of the body 10 through inlet fitting 18. The refrigerant and oil then passes through holes 62 in the baffle plate 56. The mixture then passes through core 24 which removes any water and impurities. The refrigerant and oil passes out of the core through central bore 26 and leaves the core through tapered opening 41 in flat face 38. The filtered refrigerant then passes through filter pad 46, screen 44 and perforated disc 42. The refrigerant and oil leaves the body of the receiver dehydrator through outlet fitting 22.

As projection 32 of core 24 is held in position by the resilient core support, both transversely and laterally. The core is thereby prevented from displacement which would cause the outer surface 25 of core 24 to contact inner surface 49. In addition, any impact to the body of the receiver hydrator has its force distributed by the disc shaped baffle plate, while the resilient nature of the core support cushions the core itself from the effect of the impact. At the second end, the core is held in position by the compressible filter pad. The pad cushions the second end of the core and also maintains it in spaced relation from the inner surface of the can. The core 24 being cushioned at both ends, is thereby protected from shock and vibration to which the exterior surfaces of the receiver dehydrator may be exposed.

Thus, the new receiver dehydrator achieves the above stated objectives, eliminates difficulties encountered in the use of prior devices, solves problems and obtains the desirable results described herein.

In the foregoing description, certain items have been used for brevity clarity and understanding, however no unnecessary limitations are to be implied therefrom because such terms are for descriptive purposes and are intended to be broadly construed. Moreover, the descriptions and illustrations given are by way of example and the invention is not limited to the exact detail shown or described.

Having described the features, discoveries and principles of the invention, the manner in which it is constructed and operated, and any advantages and useful results obtained; the new and useful structures, devices, elements, arrangements, parts, combinations, systems, equipment, operations and relationships are set forth in the appended claims.

We claim:

1. A shock and vibration resistant receiver dehydrator for an air conditioning system, comprising:
   a fluid tight body having an interior area, said interior area including a cylindrical portion having an inner surface;
   inlet means on said body for introducing refrigerant material into said interior area of said body;
   outlet means on said body enabling flow of refrigerant material out of said interior area;
   a desiccant core positioned in said cylindrical portion, said desiccant core including a central projection on a first end, said projection having a lateral perimeter surface, said desiccant core further including a blunt second end opposed of said first end, said second end including a perimeter edge, said edge in spaced relation of said inner surface;
   a circular baffle plate adjacent said first end of said core, said baffle plate including a recess and a radially extending flange, said flange terminating adjacent said inner surface of said cylindrical portion, said baffle plate further including passage means for enabling the passage of refrigerant material therethrough;
   a resilient core support positioned in said recess of said baffle plate between said plate and said core, said core support overlapping said lateral perimeter surface of said projection;
   supporting means for supporting said core adjacent said second end;
   a compressible, refrigerant pervious pad positioned between said second end of said core and said supporting means, said pad including an outer surface extending beyond and in overlapping relation of said perimeter edge; and
   biasing means adjacent said first end of said core for biasing said baffle plate toward said core; whereby said core is held in position and cushioned at said first and second ends.

2. A receiver dehydrator according to claim 1 wherein said baffle plate further comprises a circular lip at an outer perimeter of said flange, said lip extending parallel and adjacent of said inner surface of said cylindrical portion.

3. Receiver dehydrator according to claim 2 where in said biasing means is a coil spring; and said circular lip extends from said flange in a direction opposed of said biasing force of said spring whereby lateral movement of said spring is prevented.

4. The receiver dehydrator according to claim 3 wherein said passage means through said baffle plate comprises a plurality of spaced holes in said flange.

5. The receiver dehydrator according to claim 4 wherein said pad is a polyester pad and said pad extends beyond said edge to said inner surface of said cylindrical portion.

6. The receiver dehydrator according to claim 5 wherein said support means comprises a perforated disc in supporting relation with said core, said perforated disc positioned on said inner wall of said body.

7. The receiver dehydrator according to claim 6 wherein said support means further comprises a screen disposed between said perforated disc and said polyester pad.

8. The receiver dehydrator according to claim 7 wherein said body comprises a first end cap including an inlet fitting and a second end cap including an outlet fitting, said cylindrical portion disposed between said end caps, and said end caps and cylindrical portion welded together in fluid tight relation to form said body.

9. The receiver dehydrator according to claim 8 wherein said spring is in abutting relation of said first end cap and said perforated disc is adjacent said second end cap.

10. The receiver dehydrator according to claim 9 wherein said core is cylindrical in shape, said core includes a central longitudinal bore, and said bore is open at said second end of said core.

11. The receiver dehydrator according to claim 10 wherein said central bore extends through said core and is blocked at said first end of said core by said core support.

12. The receiver dehydrator according to claim 11 wherein the central projection is a cylindrical projection, and said core includes a frustoconical ledge adjacent said first end, said ledge terminating at said projection.

* * * * *